United States Patent
Bao et al.

(10) Patent No.: US 10,227,509 B2
(45) Date of Patent: Mar. 12, 2019

(54) HOT MELT ADHESIVE COMPOSITION FOR BOOKBINDING

(71) Applicant: HENKEL AG & CO. KGAA, Duesseldorf (DE)

(72) Inventors: Huimin Bao, Shanghai (CN); Yew-Guan Low, Shanghai (CN)

(73) Assignee: HENKEL AG & CO. KGAA, Duesseldorf (DE)

( * ) Notice: Subject to any disclaimer, the term of this patent is extended or adjusted under 35 U.S.C. 154(b) by 0 days.

(21) Appl. No.: 15/260,777

(22) Filed: Sep. 9, 2016

(65) Prior Publication Data

US 2016/0376479 A1    Dec. 29, 2016

Related U.S. Application Data

(63) Continuation of application No. PCT/CN2014/073145, filed on Mar. 10, 2014.

(51) Int. Cl.
| | |
|---|---|
| C09J 123/16 | (2006.01) |
| C09J 123/14 | (2006.01) |
| B42C 9/00 | (2006.01) |
| C09J 157/02 | (2006.01) |

(52) U.S. Cl.
CPC ........... *C09J 123/16* (2013.01); *B42C 9/0006* (2013.01); *C09J 123/14* (2013.01); *C09J 157/02* (2013.01); *C08L 2314/06* (2013.01)

(58) Field of Classification Search
CPC ...... C09J 123/14; C09J 123/16; C09J 157/02; C08L 23/16; C08L 23/14; C08L 91/06; C08L 2314/06; B42C 9/0006
See application file for complete search history.

(56) References Cited

U.S. PATENT DOCUMENTS

| | | | |
|---|---|---|---|
| 4,722,650 A | 2/1988 | Allen et al. | |
| 4,942,195 A | 7/1990 | Flanagan et al. | |
| 6,299,966 B1 * | 10/2001 | Bonke et al. | B32B 3/26 428/119 |
| 6,582,829 B1 | 6/2003 | Quinn et al. | |
| 8,476,359 B2 * | 7/2013 | Wang | C08F 214/18 524/515 |
| 2002/0120064 A1 * | 8/2002 | Khandpur et al. | C08L 23/14 525/240 |
| 2014/0038486 A1 | 2/2004 | Crowther et al. | |
| 2005/0095383 A1 | 5/2005 | Campbell et al. | |
| 2007/0068233 A1 * | 3/2007 | Lewtas et al. | C08F 255/00 73/104 |
| 2010/0143633 A1 | 6/2010 | Kanada et al. | |
| 2012/0149827 A1 * | 6/2012 | Hu et al. | C09J 123/02 524/505 |

FOREIGN PATENT DOCUMENTS

| | | |
|---|---|---|
| CN | 101684401 A | 3/2010 |
| CN | 102549096 A | 7/2012 |
| CN | 102786896 A | 11/2012 |
| CN | 103173146 A | 6/2013 |
| CN | 103205221 A | 7/2013 |
| EP | 0178062 A2 | 4/1986 |
| WO | 0134719 A1 | 5/2001 |
| WO | 2013101255 A1 | 7/2013 |
| WO | 2014014491 A1 | 1/2014 |

* cited by examiner

*Primary Examiner* — Nathan M Nutter
(74) *Attorney, Agent, or Firm* — Sun Hee Lehmann

(57) ABSTRACT

The present invention provides a hot melt adhesive composition for bookbinding comprising a base polymer, a wax and/or an oil, a tackifier, a stabilizer and optionally a filler; wherein the base polymer comprises a propylene-based elastomer, an amorphous poly-α-olefin (APAO), and optionally, an ethylene-based or propylene-based plastomer.

15 Claims, No Drawings

HOT MELT ADHESIVE COMPOSITION FOR BOOKBINDING

FIELD OF THE INVENTION

The present invention relates to a hot melt adhesive composition, especially to a polyolefin-based hot melt adhesive composition, as well as the use of the hot melt adhesive composition in bookbinding.

BACKGROUND OF THE INVENTION

Hot melt adhesives (HMAs) are 100% non-volatile solid thermoplastics. During application, a hot melt adhesive is applied to at least one of the substrates to be bonded at an elevated temperature in a molten state, brought into contact with the other substrate(s) and is then solidify upon cooling. Subsequently it forms a strong bond between these substrates. The most common applications for hot melt adhesives include case and carton sealing, binding of non-woven construction and spine, lamination and bookbinding. A typical hot melt adhesive formulation is composed of base polymer(s), diluent wax(es) or oil(s), tackifier(s), stabilizers and optional filler(s). Combinations of different raw materials are used based on different technical requirements for different application fields. For example a good adhesive for bookbinding should have a proper viscosity for processing, be flexible for multiple flipping, set fast to allow clean trimming, have a long open time to accept cover, bond well to various paper stocks, and have a wide operation temperature window for extreme high and low temperature application fields.

Compared to other technical approaches, hot melt adhesives are widely used in bookbinding because of their production efficiency and cost benefit. The most commonly used base polymers for hot melt adhesives in bookbinding applications are ethylenevinylacetate copolymers (EVAs) and styrenic block copolymers (SBC). EVA-based hot melt adhesives are employed in high speed operations due to their fast setting, lower cost and easy handling, and because EVA is one of the most versatile base polymers. However, EVA copolymers generally have poor temperature resistance, because in order to achieve enough flexibility, EVAs having a high vinylacetate (VA) content are required, which have lower softening points. Moreover, the polar VA group can lead to an inferior thermal stability of the copolymer at high temperatures in the presence of air, which can lead to the appearance of char, skin or gel. Also styrenic block copolymers have been widely employed in the state of art in hot melt adhesive formulations in order to achieve good performance for book binding.

U.S. Pat. No. 4,722,650 discloses a case for a hard cover book and a process for the production of a book case which employ a composition which inter alia comprises a specific A-B-A block or A-B-A-B-A-B multi-block styrene-butadiene copolymer.

U.S. Pat. No. 4,942,195 discloses hot melt adhesive compositions suitable for bookbinding application which inter alia contain specific Styrene-Isoprene-Styrene (SIS)/Styrene-Butadiene-Styrene (SBS) block copolymers. The compositions can contain Fischer-Tropsch waxes.

Compared to styrenic block copolymers and EVA copolymers, polyolefins have better thermal stability, wider operation temperature window and lighter odor at high temperature. Metallocene-catalyzed polyolefins have been used for packaging and show a set speed and adhesion as good as the conventional EVA products.

U.S. Pat. No. 6,582,829 B1 discloses a hot melt adhesive compositions comprising at least one homogeneous linear or substantially linear ethylene/α-olefin interpolymer and at least one block copolymer and at least one tackifying resin for paper packaging and bookbinding applications.

WO 01/34719 A1 also discloses a hot melt adhesive for use in bookbinding comprising at least one homogeneous linear or substantially linear ethylene/α-olefin interpolymer and at least one tackifying resin and optionally inter alia a block copolymer.

SUMMARY OF THE INVENTION

In the field of hot melt adhesives, especially in bookbinding, there still is a need to find adhesives with sustainable raw material supply, good machining and less odor compared to conventional EVA- and SBC-based formulations. While the required performance for book binding application can still be maintained, such as desirable viscosity, short setting time, long open time and good flexibility at room temperature.

One aspect of the present invention is directed to a hot melt adhesive composition with polyolefin components, which shows improvements in good machining, less odor and better aging performance compared to EVA- and SBC-based formulations. The hot melt adhesive composition of the invention comprises, preferably substantially comprises, more preferably is composed of, a base polymer, a wax and/or an oil, a tackifier, a stabilizer and optionally a filler; wherein the base polymer comprises, preferably substantially comprises, more preferably is composed of, a propylene-based elastomer, an amorphous poly-α-olefin (APAO), and optionally, an ethylene-based or propylene-based plastomer.

The term "substantially comprising" is to be understood as that the listed components in the claims, including the ones which are referred to as being optional, constitute the main part of the subject, for example, above 80%, preferably above 90%, more preferably above 95% of the subject, and beside them, one or more conventional additives or components may be included. For example, according to practical requirements, the composition of the present invention may include a small amount of, e.g., pigment(s), EVA copolymers and/or styrenic block copolymers (SBC), such as SEBS, SEPS, SBS, SIS and the like.

The hot melt bookbinding adhesive composition of the invention preferably has a melt viscosity of 1,000 cps to 10,000 cps at 180° C., more preferably 2,000 cps to 7,000 cps at 180° C., a setting time of less than 10 seconds, an open time of more than 20 seconds, and a softening point of higher than 80° C.

Another aspect of the invention relates to the use of the hot melt adhesive composition according to the present invention for bookbinding. The composition of the invention, which can also be referred to as spine glue, shows good ink resistance performance.

DETAILED DESCRIPTION OF THE INVENTION

The present invention will be described in detail as follows. The materials, methods, and examples herein are illustrative only and, except as specifically stated otherwise, are not intended to be limiting. Suitable methods and materials are described herein, although methods and materials similar or equivalent to those described herein can be used in the practice or testing of the present invention. All publications and other references mentioned herein are explicitly incorporated by reference in their entirety.

Unless otherwise defined, all technical and scientific terms used herein have the same meanings as commonly understood by those skilled in the art. In case of conflict, the present specification, including definitions, is decisive.

Unless stated otherwise, all percentages, parts, ratios, etc., are by weight.

Where a range of numerical values are recited herein, unless otherwise stated, the range is intended to include the endpoints thereof, and all integers and fractions within the range.

Use of "a" or "an" is employed to describe elements and components of the present invention. This is done merely for convenience and to give a general sense of the invention. This description should be read to include one or at least one and the singular also includes the plural unless it is obvious that it is meant otherwise.

Other than in the operating examples, or where otherwise indicated, all numbers expressing quantities of ingredients, reaction conditions, or defining ingredient parameters used herein are to be understood as modified in all instances by the term "about".

The term "bookbinding" is used to describe the process by which books are produced. The term "books" is intended to include articles containing pages bound with an adhesive including but being not limited to paperback books, hardcover, pamphlets, laboratory notebooks, soft cover books, magazines, instruction manual magazines, catalogs, trade journals, directories and the like.

The term "open time" used herein refers to the maximum period for a hot melt adhesive to form a bond during cooling down from its application temperature. During the open time, an adhesive bond can be formed between two substrates. After the open time, the adhesive shows substantially no tackiness towards further substrates. For hot melt adhesive application, open time is the longer the better. In this context, the unit for open time is always "seconds" or "s".

The term "setting time", "set time" or similar used herein refers to the time that is necessary to obtain a fiber tearing bond upon compression of the substrates to be bonded once the bond is formed within a proper open time. If the compression time is longer or equal to the setting time value, then a full fiber tear bond can be achieved. Otherwise, a full fiber tear bond cannot be formed. The setting time of hot melt adhesives should be short enough for process requirement. In this context, the unit for setting time is always "seconds" or "s".

The term "room temperature (RT)" used herein refers to around 25° C.

The term "polymer" means a macromolecular compound composed of repeated monomers of the same or different type. The term "polymer" includes homopolymers and copolymers. The term "copolymer" should be understood as a polymer derived from two or more monomers, that is to say, the term "copolymer" includes bipolymers, terpolymers, tetrapolymers and so on.

As mentioned above, one aspect of the invention is to provide a hot melt adhesive composition which comprises, preferably substantially comprising or more preferably is composed of a base polymer, a wax and/or an oil, a tackifier, a stabilizer and optionally a filler; wherein the base polymer comprises, preferably substantially comprises or more preferably is composed of a propylene-based elastomer, an amorphous poly-α-olefin (APAO), and optionally, an ethylene-based or propylene-based plastomer.

Each component in the composition of the present invention will be described in detail below.

Propylene-Based Elastomer

The propylene-based elastomers suitable for the composition of the invention preferably are propylene-based elastomers which preferably have a Melt Flow Rate (MFR) of below 100 g/10 min, more preferably below 50 g/10 min, measured at 230° C./2.16 kg according to ASTM D1238, a density of no more than 0.865 g/m$^3$ measured according to ASTM D1505, and a enthalpy of fusion of less than 10 J/g, more preferably less than 5 J/g, measured by Differential Scanning Calorimetry.

The enthalpy of fusion in the present invention is measured by Differential Scanning Calorimeters conventionally used in the art, such as, Q 2000 from TA instruments-Waters LLC.

The enthalpy of fusion in the present invention, for example, can be measured in a temperature range of −50° C. to 200° C. with a heating rate of 10° C./min and a cooling rate of −10° C./min, and by taking the enthalpy of fusion of the third heating/cooling circulation.

The propylene-based elastomer is also referred to as "the elastomer" in the present invention.

The propylene content in the elastomers is preferably more than 60 wt %, more preferably more than 70 wt % and most preferably more than 80 wt %. The elastomers are preferably metallocene-catalyzed elastomers. "Metallocene-catalyzed elastomers" or similar terms mean any elastomers that are obtained through polymerization of olefinic monomers using metallocene catalytic system. Exemplary polymers and preparation methods are disclosed, e.g., in US 2014/0038486 A1, which are hereby incorporated by reference.

Preferably, the propylene-based elastomers used in the composition of the present invention include but are not limited to propylene copolymers where the one or more comonomers is/are selected from ethylene, butene, hexylene and octene or a combination thereof. More preferably, the propylene-based elastomers include but are not limited to propylene-ethylene copolymers or propylene-ethylene-butene terpolymers.

The adhesive composition of the invention may comprise one or more propylene-based elastomers as described above.

Examples of commercially available products of the propylene-based elastomer include but are not limited to Vistamaxx™ series products from ExxonMobil Chemical and Versify™ series from Dow Chemical.

The amount of the propylene-based elastomer in the composition of the invention may be preferably 2 to 30 wt. %, more preferably 5 to 15 wt. %, most preferably 7 to 13 wt. %, based on the total weight of the composition.

Amorphous Poly-α-Olefin (APAO)

The amorphous poly-α-olefins (APAOs) suitable for the present invention consist of several different categories of atactic, low molecular weight, low melt viscosity, and essentially amorphous propylene based polymers, which are typically polymerized by means of processes which employ a Ziegler-Natta catalyst, in generally resulting in a relatively broad molecule weight distribution (Mw/Mn), typically greater than 4. These polymers are well known to those skilled in the art and can be either homopolymers of propylene or copolymer of propylene with one or more α-olefinic comonomers preferably selected from C2-C8 α-olefins, more preferably selected from ethylene, 1-butane, 1-hexane and 1-ocetene or combinations thereof.

The weight average molecular weight of the APAO polymers used in the invention is preferably in the range of no less than 1000 g/mol, more preferably in a range having any lower limit of 1,000, 2,000, 3,000, 4,000 or 5,000 g/mol in combination with any upper limit of 50,000, 45,000, 30,000 or 20,000 g/mol, most preferably 1,000 to 50,000 g/mol or 1000 to 30,000 g/mol. The Brookfield viscosity at 180° C. of the APAOs suitable for the composition of the invention is preferably in the range of no less than 1000 cps, more preferably in a range having any lower limit of 1,000, 2,000, 3,000, 4,000 or 4,500 cps in combination with any upper limit of 10,000, 8,000, 6,000 or 5,000, most preferably 1000 cps to about 10,000 cps or 1000 cps to 5000 cps.

The APAO polymers have advantageously a ring and ball softening point between 80 and 170° C. and a glass transition temperature from −5 to −40° C. and a MFR value of more than 1000 g/10 min measured at 230° C./2.16 kg according to ASTM D1238.

The adhesive composition of the invention may comprise one or more APAOs as described above.

Examples of commercially available products of the APAO include but are not limited to VESTOPLAST® series products from EVONIK, Rextac® series products from Huntsman, Eastoflex™ from Eastman and so on.

The amount of the APAO in the composition of the invention may be preferably 10 to 50 wt. %, or more preferably 20 to 40 wt. %, more preferably 25 to 35 wt. % based on the total weight of the composition.

Ethylene-Based or Propylene-Based Plastomer

The ethylene-based or propylene-based plastomers suitable for the composition of the invention preferably are ethylene-based or propylene-based plastomers having in general an MFR of preferably more than 20 g/10 min, more preferably 30 g/10 min to 1000 g/10 min, measured at 230° C./2.16 kg according to ASTM D1238, a density of greater than 0.865 g/m$^3$, more preferably >0.865 g/m$^3$ to 1.0 g/m$^3$, most preferably >0.865 g/m$^3$ to 0.9 g/m$^3$, measured according to ASTM D1505, and a enthalpy of fusion preferably of more than 10 J/g, more preferably of more than 15 J/g, measured by Differential Scanning Calorimetry.

The test method for the enthalpy of fusion of the plastomers is the same as the above described test method for the enthalpy of fusion of the elastomers.

The ethylene-based or propylene-based plastomer is also referred to as "the plastomer" in the present invention.

Preferably, the plastomers are metallocene-catalyzed plastomers. "Metallocene-catalyzed plastomers" or similar term means any plastomers that are obtained through polymerization of olefinic monomers using metallocene catalytic system.

Examples of the plastomer used herein include but are not limited to those copolymers where the main monomer (monomer content being more than 50 wt. %) is ethylene for ethylene based plastomers and is propylene for propylene based plastomers. The one or more comonomers is/are preferably selected from ethylene, propylene, butene, hexylene and octene or combinations thereof.

The adhesive composition of the invention may comprise one or more ethylene-based or propylene-based plastomers as described above.

Examples of commercially available products of the plastomer include but are not limited to Engage™ and Affinity™ series products from Dow Chemical; Exact™ series products from ExxonMobil Chemical; Tafmer™ series products from Mitsui Chemicals.

The amount of the plastomer in the composition of the invention can be 0 to 25 wt. %, it can preferably be 1 to 25 wt. %, more preferably be 1 to 15 wt. %, most preferably 2 to 10 wt. %, based on the total weight of the composition.

Wax and Oil

The waxes and oils known in the art may be used in the composition of the invention without any particular limitation. For example, waxes selected from microcrystalline waxes, polyethylene waxes, Fischer-Tropsch waxes, paraffin waxes and polypropylene waxes or combinations thereof may be used. Preferably microcrystalline waxes and/or polypropylene waxes may be used. As the oils, for example oils selected from hydrotreated heavy naphthenic petroleum oils, paraffinic oils or combinations thereof may be used. Commercially available products include but are not limited to KN 4006, KN4008, KN4010, KP 6005, KP 6002, KP 6010 from lubricant company of Petrochina, LP 150, LP 350 and LP 500 from Kukdong.

The waxes and oils described above may be used in the composition of the invention alone or in a mixture of two or in a mixture of more than two thereof.

Examples of commercially available waxes include but are not limited to Sasolwax® C80 from Sasol and A-C® 1660 from Honeywell.

The amount of the wax and/or oil in the composition of the invention may be preferably 1 to 40 wt. %, more preferably 5 to 40 wt. %, most preferably 15 to 35 wt.-% based on the total weight of the composition.

Tackifier

The hot melt adhesive composition of the invention may comprise one or more tackifiers known in the art.

Examples of those tackifiers include: aliphatic petroleum hydrocarbon resins, alicyclic petroleum hydrocarbon resins, modified hydrocarbons and hydrogenated derivatives thereof. The modified hydrocarbons are resulting from the polymerization of monomers consisting primarily of olefins or diolefins, which are optionally grafted with one or more functional groups like maleic anhydride. The olefins or diolefins are preferably selected from piperylene, isoprene, dicyclopentadiene or 2-methyl-2-butene. The combinations of these tackifier types are also be used. These tackifiers have a ring and ball softening point from 70° C. to 150° C. (ASTM E 28).

Examples of commercially available products of tackifiers include but are not limited to I Marv P 100, I Marv S 100, I Marv S 110, I Marv P 125, I Marv P 140 from Idemitsu, SU 100, SU 100S, SU110, SU120, SU130, SU 400, SU 420, SU500, SU 525, R 1100S, A 1100S from Kolon, Eastotac C-100W, C 115W, H 100W, H 115W, H130W, H142W, C-100R, H130R, H142R, Reglite R1100, Reglite R1125 from Eastman and Luhorez A-1100S, A 1100, A 2100 from Qilu Yixi Luhua Chemical Co., Ltd.

The amount of the tackifier in the composition of the invention may be preferably 10 to 50 wt. %, more preferably 20 to 40 wt. %, or most preferably 25 to 35 wt.-% based on the total weight of the composition.

Stabilizer

In the present invention, the term "stabilizer" has the same meaning as the term "antioxidant" and they can be used interchangeably.

Stabilizers utilized herein include hindered phenols and multifunctional phenols such as sulfur and phosphorous containing phenols. Hindered phenols are well known in the art and may be characterized as phenolic compounds which also contain sterically bulky radicals in close proximity to the phenolic hydroxyl group thereof. In particular, tertiary butyl groups are generally introduced through substitution in the benzene ring in at least one of the ortho positions relative to the phenolic hydroxyl group thereof. The presence of these sterically bulky substituted radicals in the vicinity of the hydroxyl group serves to retard its stretching frequency and correspondingly its reactivity. Thus, this steric hindrance provides the phenolic compound with its stabilizing properties. Exemplary representative hindered phenols include 1,3,5-trimethyl-2,4,6-tris(3,5-ditert-butyl-4-hydroxybenzyl)benzene, pentaerythrityl tetrakis-3(3,5-ditert-butyl-4-hydroxybenzyl)propionate, n-octadecyl-3(3,5-ditert-butyl-4-hydroxybenzyl)propionate, 4,4'-methylene bis (2,6-tert-butylphenol), 4,4'-thiobis-(6-tert-butyl-o-cresol), 2,6-tert-butylphenol, 6-(4-hydroxyphenoxy)2,4-bis(n-octylthio)-1,3,5-triazine, di-n-octadecyl 3,5-ditert-butyl-4-hydroxy-benzylphosphonate, 2-(n-octylthio)ethyl 3,5-di-tert-butyl-4-hydroxy-benzoate and sorbitol hexa([3-(3,5-ditert-butyl-4-hydroxylphenyl)-propionate].

The hot melt adhesive composition of the invention may comprise one or more stabilizers known in the art.

Examples of commercially available stabilizers or antioxidants include but are not limited to Irganox® 1010, Irganox® 1076 and Irgafos® 168 from BASF.

The amount of the stabilizer in the composition of the invention may be preferably 0.01 to 5 wt. %, more preferably 0.1 to 1 wt. %, most preferably 0.4 to 1 wt.-% based on the total weight of the composition.

Filler

One or more fillers may be optionally included in the adhesive composition of the invention. Suitable exemplary fillers include organic or inorganic particles, including calcium carbonate, silica, clays, talc, titanium dioxide, zeolites, powdered metals, organic or inorganic fibers, including carbon fibers, silicon nitride fiber, steel wire or mesh, and nylon or polyester cording, nano-sized particles, and the like.

The amount of the filler in the composition of the invention may be 0 to 60 wt. %, preferably 1 to 30 wt. %, more preferably 1 to 10 wt. %, based on the total weight of the composition.

EXAMPLES

The present invention will be further described and illustrated in details with reference to the following examples, which, however, are not intended to restrict the scope of the present invention. All numbers in the examples are expressed in parts by weight.

Materials Used in the Examples

Vistamaxx 6202, a propylene-based elastomer from ExxonMobil Chemical, having a density of 0.861 g/m$^3$ (ASTM D1505) and a MFR value at 230° C./2.16 kg of 18 g/10 min (ASTM D1238), and the ethylene content thereof being 15% by weight.

Tafmer A-70090 is a plastomer made of ethylene-butene copolymer from Mitsui Chemicals, having a density of 0.893 g/m$^3$ (ASTM D1505) and a MFR value at 230° C./2.16 kg of 130 g/10 min (ASTM D1238)

Tafmer PN-20300 is a polypropylene based plastomer from Mitsui Chemicals, having a density of 0.868 g/m$^3$ (ASTM D1505) and a MFR value at 230° C./2.16 kg of 30 g/10 min (ASTM D1238).

Affinity GA 1950 is a polyolefin plastomer from Dow Chemicals, having a density of 0.874 g/m$^3$ (ASTM D1505) and an approximate melt index at 190° C./2.16 kg of 500 g/10 min.

Polymer A is an APAO, which is a copolymer of propylene and ethylene monomers and having a viscosity at 190° C. of 2000-4000 cps.

Vestoplast 703, an APAO from Evonik, having a molecular weight (Mw) of 34,000 g/mol, a Brookfield viscosity at 190° C. of 2000-3400 cps and density of 0.87 g/cm$^3$ at 23° C.

Sasolwax C80 is a Fischer-Tropsch wax from Sasol with a congealing point from 78-83° C. according to ASTM D 938.

A-Ce® 1660 is a polypropylene wax from Honeywell with a melting point of 150° C. according to ASTM D-3954.

KN 4010 is a hydrotreated heavy naphthenic petroleum oil from lubricant company of Petrochina.

Luhorez A-1100S is an alphatic hydrocarbon tackifier resin with a ring and ball softening point of 100° C. according to ASTM E 28 from Qilu Yixi Luhua Chemical Co., Ltd.

Eastotac C-100W is a tackifier resin with a ring and ball softening point of 100° C. according to ASTM E 28 and a molten Gardner color of <1 from Eastman.

Irganox 1010 is an antioxidant from BASF.

Test Methods

Melt Viscosity

The melt viscosity of the hot melt adhesive composition of the invention was measured using Brookfield RVT Thermosel Viscometer with a 27# spindle according to GB/T 2794-1995, and the rotational speed of the chosen spindle was adjusted in a way that the torque reading was in the range of 10-80%.

Peak Stress and Elongation at Break

The peak stress and elongation at break are two parameters reflecting the toughness and flexibility of hot melt bookbinding adhesives, and were determined using Instron tensile mode according to GB/T 528-1998, wherein the stretching speed was 12 in/min and the film thickness was around 3 mm. Five specimens were tested for each formulation, and the results were averaged.

The peak stress of the hot melt adhesives suitable for bookbinding should be above 200 psi.

The elongation at break of the hot melt adhesives suitable for bookbinding should be above 300%.

Open Time and Setting Time

The open time and setting time were determined at 170° C. by a hot melt tester using single wall corrugated paperboards as substrates. The size of the top piece of the substrate was 5 cm×5 cm and the bottom piece was 5 cm×9 cm.

For the open time test, once the sample is totally molten, apply the molten adhesive between two paper substrates and fix the setting time at 30 seconds, then start open time value test from 1 second and repeat by increasing the time for 1 second each time, look for the time from full fiber tear to no fiber tear. The end of full fiber tear is the open time of samples. The test is usually three times repeated and the data are averaged.

For setting time test, start set time from 0.5 second and then repeat by increasing the time for 0.5 second each time, look for partial fiber tear to full fiber tear. The lowest time of getting full fiber tear is the set time. The test is usually three times repeated and the data are averaged.

The open time of the hot melt adhesives suitable for bookbinding should be more than 15 seconds, the longer the better, and the setting time should be less than 10 seconds, the shorter the better.

Examples 1-4

Adhesive samples 1-4 were prepared using the components shown in Table 1. Various performances were tested according to the above methods and the results are shown in Table 1.

TABLE 1

| Components | Example 1 | Example 2 | Example 3 | Example 4 |
|---|---|---|---|---|
| Elastomer: Vistamaxx 6202 | 10 | 13 | 10 | 10 |
| APAO: Polymer A | 32 | 35 | 35 | 25 |
| Plastomer: Tafmer A 70090 | 10 | | | |
| Plastomer Tafmer PN 20300 | | | | 4 |
| Wax: Sasolwax C80 | 15 | 17 | | |
| Wax AC 1660 | | | 20 | 25 |
| Oil: KN 4010 | | | | 6 |
| Tackifier: Luhorez A 1100S | 33 | 35 | 35 | 30 |
| Antioxidant: Irganox 1010 | 0.4 | 0.4 | 0.4 | 0.4 |
| Melt Viscostiy @ 180° C., cps | 5863 | 5075 | 3900 | 4175 |
| Peak stress, psi | 301 | 219 | 490 | 327 |
| Elongation @ Break, % | 900 | 654 | 670 | 700 |
| Setting time, s | 8 | 8 | 8 | 8 |
| Open time, s | 28 | 28 | 40 | 28 |

In table 1, it can be seen that the inventive compositions (Examples 1-4) show good performances for bookbinding regarding to melt viscosity, peak stress, elongation at break, open time and setting time.

Comparative Examples 1 and 2

Comparative adhesive samples 1 and 2 were prepared using the components listed in Table 2. Various performances were tested according to the above methods and the test results are shown in Table 2.

TABLE 2

| Components | Comparative Example 1 | Comparative Example 2 |
|---|---|---|
| Elastomer: Vistamaxx 6202 | | 10 |
| APAO: Polymer A | 35 | |
| Plastomer: Tafmer A 70090 | 20 | 25 |
| Wax: Sasolwax C80 | 15 | 20 |
| Tackifier: Luhorez A 1100S | 30 | 45 |
| Antioxidant: Irganox 1010 | 0.4 | 0.4 |
| Melt Viscostiy @ 180° C., cps | 3160 | 9750 |
| Peak stress, psi | 367 | 739 |
| Elongation @ Break, % | 176 | 222 |

From table 2, it can be seen that the elongation at break values in Comparative Examples 1 and 2 are too low to be acceptable for bookbinding since Comparative Example 1 does not contain the elastomer of the invention and Comparative Example 2 does not contain the APAO; moreover, the melt viscosity in Comparative Example 2 is too high to be acceptable for bookbinding.

Examples 5-8

Adhesive samples 5-8 were prepared using the components listed in Table 3. Various performances were tested according to the above methods and the test results are shown in Table 3.

TABLE 3

| | Example 5 | Example 6 | Example 7 | Example 8 |
|---|---|---|---|---|
| Elastomer: Vistamaxx 6202 | 7 | 10 | 7 | 13 |
| APAO: Vestoplast 703 | 32 | 35 | 32 | 26 |
| Plastomer: Tafmer A 70090 | 10 | 10 | 10 | |
| Plastomer: Affinity GA 1950 | | | | 10 |
| Wax: Sasolwax C80 | 18 | 15 | 18 | 18 |
| Tackifier: A 1100S | 33 | 30 | | |
| Tackifier: Eastotac C 100W | | | 33 | 33 |
| Antioxidant: Irganox 1010 | 0.4 | 0.4 | 0.4 | 0.4 |
| Melt Viscostiy @ 180° C., cps | 2770 | 4637 | 3350 | 4158 |
| Peak stress, psi | 490 | 407 | 515 | 452 |
| Elongation @ Break, % | 532 | 1200 | 556 | 1888 |

In Examples 5-8, different APAOs, tackifiers and plastomers according to the present invention were used. From Table 3, it can be seen that hot melt bookbinding adhesives having good performances were obtained in all cases.

The present invention is illustrated in details in the embodiments. However, it is apparent for those skilled in the art to modify and change the embodiments without deviating from the spirit of the invention. All the modifications and changes should fall in the scope of the appended claims of the present application.

The invention claimed is:

1. A hot melt adhesive composition comprising:
    a base polymer comprising a propylene-based elastomer, an amorphous poly-α-olefin (APAO), and 1 to 25 wt. %, based on the total weight of the composition, of an ethylene-based or propylene-based plastomer;
    a wax and/or an oil;
    a tackifier;
    a stabilizer; and
    optionally, a filler;
    wherein the ethylene-based or propylene-based plastomer has a MFR of more than 20 g/10 min, measured at 230° C./2.16 kg according to ASTM D1238; a density of greater than 0.865 g/m$^3$, measured according to ASTM D1505; and a enthalpy of fusion of more than 10 J/g, measured by Differential Scanning Calorimetry, and
    wherein the elastomer has a Melt Flow Rate (MFR) of below 100 g/10 min, measured at 230° C./2.16 kg according to ASTM D1238; a density of no more than 0.865 g/m$^3$ measured according to ASTM D1505, and an enthalpy of fusion of less than 10 J/g, measured by Differential Scanning Calorimetry.

2. The hot melt adhesive composition according to claim 1, wherein the amorphous poly-α-olefin has a weight average molecular weight of no less than 1,000 g/mol, and a Brookfield viscosity at 180° C. of no less than 1000 cps.

3. The hot melt adhesive composition according to claim 1, wherein the ethylene-based or propylene-based plastomer has a MFR of 30 g/10 min to 1000 g/10 min, measured at 230° C./2.16 kg according to ASTM D1238; a density of 0.865 to 1.0 g/m$^3$, measured according to ASTM D1505; and an enthalpy of fusion of more than 15 J/g, measured by Differential Scanning Calorimetry.

4. The hot melt adhesive composition according to claim 1, wherein the propylene-based elastomer is a copolymer of propylene with one or more comonomers selected from ethylene, butene, hexylene and octene or a combination thereof.

5. The hot melt adhesive composition according to claim 1, wherein the ethylene-based plastomer is a copolymer of ethylene with one or more comonomers selected from propylene, butene, hexylene and octene or a combination thereof, and the propylene-based plastomer is a copolymer of propylene with one or more comonomers selected from ethylene, butene, hexylene and octene or a combination thereof.

6. The hot melt adhesive composition according to claim 1, wherein the APAO is a homopolymer of propylene or a copolymer of propylene with one or more α-olefinic comonomers selected from ethylene, 1-butane, 1-hexane and 1-octene or a combination thereof.

7. The hot melt adhesive composition according to claim 1, wherein the elastomer is a metallocene-catalyzed elastomer and/or the plastomer is a metallocene-catalyzed plastomer.

8. The hot melt adhesive composition according to claim 1, wherein the propylene-based elastomer is present in the composition in an amount of 2 to 30 wt. %, based on the total weight of the composition.

9. The hot melt adhesive composition according to claim 1, wherein the amorphous poly-α-olefin is present in the composition in an amount of 10 to 50 wt. %, based on the total weight of the composition.

10. The hot melt adhesive composition according to claim 1, wherein the ethylene-based or propylene-based plastomer is present in the composition in an amount of 1 to 25 wt. %, based on the total weight of the composition.

11. The hot melt adhesive composition according to claim 1, wherein the wax is selected from microcrystalline waxes, polyethylene waxes, Fischer-Tropsch waxes, paraffin waxes and polypropylene waxes or a combination thereof.

12. The hot melt adhesive composition according to claim 1, wherein the oil is selected from hydrotreated heavy naphthenic petroleum oils and paraffinic oils or a combination thereof.

13. The hot melt adhesive composition according to claim 1, wherein the wax and/or the oil is present in the composition in an amount of 1 to 40 wt. %, based on the total weight of the composition.

14. The hot melt adhesive composition according to claim 1, wherein the tackifier is present in the composition in an amount of 10 to 50 wt %, based on the total weight of the composition.

15. A book comprising the hot melt adhesive composition according to claim 1.

* * * * *